United States Patent
Liu et al.

(10) Patent No.: US 11,668,968 B2
(45) Date of Patent: Jun. 6, 2023

(54) COLOR FILTER SUBSTRATE AND DISPLAY PANEL

(71) Applicants: Beijing BOE Display Technology Co., Ltd., Beijing (CN); BOE Technology Group Co., Ltd., Beijing (CN)

(72) Inventors: Xiaona Liu, Beijing (CN); Xibin Shao, Beijing (CN)

(73) Assignees: Beijing BOE Display Technology Co., Ltd., Beijing (CN); BOE Technology Group Co., Ltd., Beijing (CN)

( * ) Notice: Subject to any disclaimer, the term of this patent is extended or adjusted under 35 U.S.C. 154(b) by 0 days.

(21) Appl. No.: 17/253,559

(22) PCT Filed: Mar. 4, 2020

(86) PCT No.: PCT/CN2020/077837
§ 371 (c)(1),
(2) Date: Dec. 17, 2020

(87) PCT Pub. No.: WO2021/174462
PCT Pub. Date: Sep. 10, 2021

(65) Prior Publication Data
US 2022/0050325 A1 Feb. 17, 2022

(51) Int. Cl.
*G02F 1/1335* (2006.01)

(52) U.S. Cl.
CPC .. *G02F 1/133514* (2013.01); *G02F 1/133512* (2013.01)

(58) Field of Classification Search
None
See application file for complete search history.

(56) References Cited

U.S. PATENT DOCUMENTS

| 8,012,385 B2 | 9/2011 | Kim |
| 9,151,992 B2 | 10/2015 | Lee et al. |

(Continued)

FOREIGN PATENT DOCUMENTS

| CN | 103676333 A | 3/2014 |
| CN | 106802508 A | 6/2017 |

(Continued)

OTHER PUBLICATIONS

Written Opinion issued in International Application No. PCT/CN2020/077837, dated Dec. 4, 2020 with English translation, (4).

(Continued)

*Primary Examiner* — Shan Liu
(74) *Attorney, Agent, or Firm* — Arch & Lake LLP (57) ABSTRACT

A color filter substrate includes a base substrate, a black matrix layer and a color filter layer. The color filter layer includes a plurality of color photoresist units arranged in an array, the plurality of color photoresist units being formed with a plurality of color photoresist rows, a plurality of first color photoresist columns, a plurality of second color photoresist columns and a plurality of third color photoresist columns, and wherein the color filter layer further includes at least one filling part located between the color photoresist rows and has a thickness equal to that of at least one of the plurality of color photoresist units; and the black matrix layer is disposed between the color filter layer and the base substrate, and includes a plurality of light transmitting windows.

18 Claims, 5 Drawing Sheets

(56) References Cited

U.S. PATENT DOCUMENTS

| | | | |
|---|---|---|---|
| 2004/0229140 A1 | 11/2004 | Kim | |
| 2009/0033842 A1* | 2/2009 | Yu | G02F 1/136209 349/106 |
| 2009/0153785 A1* | 6/2009 | Iwato | G02F 1/13394 349/106 |
| 2011/0069258 A1* | 3/2011 | Joo | G02B 5/201 349/106 |
| 2014/0085558 A1* | 3/2014 | Lee | G02F 1/13394 349/43 |
| 2017/0168340 A1* | 6/2017 | Dong | G02F 1/133514 |
| 2017/0299918 A1* | 10/2017 | Yu | G02F 1/133512 |

FOREIGN PATENT DOCUMENTS

| | | | |
|---|---|---|---|
| CN | 109976026 A | | 7/2019 |
| CN | 106802508 B | | 4/2020 |
| JP | 2009271491 A | * | 11/2009 |
| KR | 20150079210 A | * | 7/2015 |
| WO | 2020211703 A1 | | 10/2020 |

OTHER PUBLICATIONS

First Chinese Office Action issued to Chinese Application No. 202090000016.1 dated Jan. 18, 2021 with English translation, (4p).
Written Opinion issued in International Application No. PCT/CN2018/077837, dated Dec. 4, 2020 with English translation, (4).

* cited by examiner

COLOR FILTER SUBSTRATE AND DISPLAY PANEL

CROSS-REFERENCE TO RELATED APPLICATIONS

This application is a national phase application under 35 U.S.C. § 371 of International Patent Application No. PCT/CN2020/077837, filed on Mar. 4, 2020, the entire contents of which are incorporated herein by reference as a part of this application.

TECHNICAL FIELD

The present disclosure relates to the field of display technology, and more particularly, to a color filter substrate and a display panel.

BACKGROUND

Narrow bezel display panels are more and more widely used, such as being applicable to splicing screens or cell phones with a high screen-to-body ratio. A display panel, particularly when being applied to a product such as a splicing screen, needs to have an ultra-narrow bezel, and has a sealing area with a size of even less than 0.5 mm. However, an ultra-narrow bezel liquid crystal display product is prone to emit green light when displaying a grayscale of 0 (L0) screen, resulting in poor display of greening on the L0 screen. This reduces a display quality of the display panel.

The above information disclosed in the background section is only used to enhance the understanding of the background of the present disclosure, and therefore may include information that does not constitute the prior art known to those of ordinary skill in the art.

SUMMARY

An objection of the present disclosure is providing a color filter substrate and a display panel for reducing poor light emission of a display panel in an L0 screen.

In order to achieve the above inventive objection, the present disclosure adopts the followings technical solutions.

According to a first aspect of the present disclosure, there is provided a color filter substrate, comprising:

a base substrate;

a color filter layer disposed on a side of the base substrate and comprising a plurality of color photoresist units arranged in an array, the plurality of color photoresist units being formed with a plurality of color photoresist rows, a plurality of first color photoresist columns, a plurality of second color photoresist columns and a plurality of third color photoresist columns, wherein any one of the color photoresist rows comprises a first color photoresist unit, a second color photoresist unit, and a third color photoresist unit which are periodically arranged, any one of the first color photoresist columns consists of a plurality of first color photoresist units, any one of the second color photoresist columns consists of a plurality of second color photoresist units, and any one of the third color photoresist columns consists of a plurality of third color photoresist units, and wherein the color filter layer further comprises at least one filling part located between the color photoresist rows and having a thickness equal to that of at least one of the plurality of color photoresist units; and a black matrix layer disposed between the color filter layer and the base substrate, and comprising a plurality of light transmitting windows, respective light transmitting windows being covered by respective color photoresist units in a one-to-one correspondence.

In an exemplary embodiment of the present disclosure, the first color photoresist units have a lower light transmittance than that of the second and third color photoresist units, and the filling part comprises a plurality of first filling parts, respective first filling parts and respective first color photoresist units are connected with each other.

In an exemplary embodiment of the present disclosure, the filling part has a same material and thickness as the first color photoresist units.

In an exemplary embodiment of the present disclosure, the filling part has a same material and thickness as the first color photoresist units, and one of the first filling parts is disposed between two adjacent first color photoresist units of any one of the first color photoresist columns, one of the first filling parts is disposed between two adjacent second color photoresist units of any one of the second color photoresist columns, and one of the first filling parts is disposed between two adjacent third color photoresist units of any one of the third color photoresist columns In an exemplary embodiment of the present disclosure, the filling part comprises a first filling part and a second filling part, and the first filling part has a same material and thickness as the first color photoresist units, and the second filling part has a same material and thickness as the second color photoresist units.

In an exemplary embodiment of the present disclosure, the second filling part is disposed between two adjacent first color photoresist units of one of the first color photoresist columns.

In an exemplary embodiment of the present disclosure, the first filling part is disposed between two adjacent second color photoresist units of one of the second color photoresist columns and between two adjacent third color photoresist units of one of the third color photoresist columns.

In an exemplary embodiment of the present disclosure, the color filter substrate includes an edge area and a central area surrounded by the edge area, and any one of the filling parts is not connected with any one of the color photoresist units in the edge area.

In an exemplary embodiment of the present disclosure, the color filter substrate further comprises:

a supporting pillar disposed on a side of the filling part away from the base substrate, an orthographic projection of the supporting pillar on the base substrate being located within an orthographic projection of the filling part on the base substrate.

In an exemplary embodiment of the present disclosure, the first color photoresist units are red color photoresist units, the second color photoresist units are blue color photoresist units, and the third color photoresist units are green color photoresist units.

According to a second aspect of the present disclosure, there is provided a display device comprising the above color filter substrate and an array substrate disposed to be opposite to the color filter substrate.

BRIEF DESCRIPTION OF THE DRAWINGS

The above and other features and advantages of the present disclosure will become more apparent by describing example embodiments thereof in detail referring to the drawings.

The reference numerals of main elements in the drawings are explained as follows:

1: red color photoresist strip; 2: green color photoresist strip; 3: blue color photoresist strip; 100: base substrate; 200: black matrix layer; 201: light transmitting window; 300: color filter layer; 301: first color photoresist column; 302: second color photoresist column; 303: third color photoresist column; 304: color photoresist row; 310: color photoresist unit; 311: first color photoresist unit; 312: second color photoresist unit; 313: three color photoresist unit; 320: filling part; 321: first filling part; 322: second filling part; 330: first color photoresist pattern; 340: second color photoresist pattern; 350: exposure window; 400: supporting pillar layer; 401: supporting pillar; A: row direction; B: column direction; C: edge area; and D: central area.

DETAILED DESCRIPTION

Example embodiments will now be described more fully with reference to the accompanying drawings. However, the example embodiments can be implemented in various forms and should not be construed as limited to the embodiments set forth herein; rather, these embodiments are provided so that this disclosure will be thorough and complete, and will fully convey the concept of the example embodiments to those skilled in the art. The described features, structures or characteristics can be combined in one or more embodiments in any suitable manner. In the following description, many specific details are provided to give a sufficient understanding of embodiments of the present disclosure.

In the attached drawings, for clarity, thicknesses of regions and layers may be exaggerated, or gaps between different structures may also be exaggerated. The same reference numerals in the drawings refer to the same or similar structures, and thus detailed descriptions thereof will be omitted.

The described features, structures or characteristics can be combined in one or more embodiments in any suitable manner. In the following description, many specific details are provided to give a sufficient understanding of embodiments of the present disclosure. However, those skilled in the art will realize that the technical solutions of the present disclosure can be practiced without one or more of the specific details, or other methods, components, materials, etc. can be employed. In other cases, well-known structures, materials, or operations are not shown or described in detail to avoid obscuring the main technical ideas of the present disclosure.

The terms "a", "an", "the", and "said" are used to indicate the presence of one or more elements/components/etc.; the terms "comprising", "including", and "having" are used to indicate open-ended inclusive meanings, and means that there may be additional elements/components/etc., in addition to the listed elements/components/etc. The terms "first" and "second" are only used as markers, not to limit the number of objects.

Figure 1:
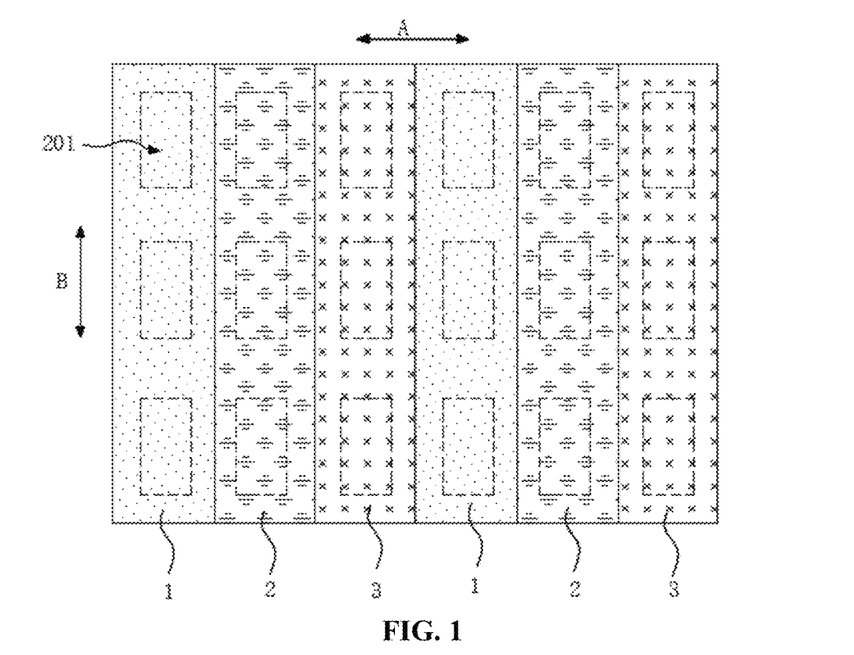
FIG. 1 is a schematic top view of a structure of a color filter substrate in the related art.

In the related art, a color filter substrate may include a base substrate, a black matrix layer, and a color filter layer stacked in sequence, wherein the black matrix layer is formed with a plurality of light transmitting windows arranged in an array. FIG. 1 is a schematic top view of a black matrix layer and a color filter layer in the related art, in which the dotted rectangular frame is a light transmitting window 201 covered by the color filter layer. By referring to FIG. 1, the color filter layer may include red color photoresist strips 1, green color photoresist strips 2 and blue color photoresist strips 3 periodically arranged along a row direction A, and any one of the color photoresist strips extends along a column direction B and covers a plurality of light transmitting windows 201 arranged linearly in a second direction. As such, respective light transmitting windows 201 are covered by respective color photoresist strips.

After long-term and extensive experiments, the inventors found that in the narrow bezel LCD panel, the black matrix layer is easily exposed to the environment due to a sealing area being relatively narrow; the black matrix layer exposed to the environment may act as a medium to introduce external charges into inside of the display panel, and these introduced charges will accumulate on the color photoresist strips, particularly easily accumulate on the green color photoresist strips 2; and an electromotive force perpendicular to a base substrate direction will be generated between the charges accumulated on the color photoresist strips and pixel electrodes of an array substrate, and the liquid crystals can be rotated by the electromotive force, which in turn causes poor display of greening on an L0 screen.

Not only that, a large number of metal patterns are provided on a driving substrate of the liquid crystal display panel, and when the display panel is driven by the driving substrate, these metal patterns, in particular, gate wirings in the row direction, need to carry high voltage signals. This will accordingly cause static electricity to be generated in the black matrix layer and the color filter layer of the color filter layer through coupling, thereby making edges of the display panel reddish and the display area thereof greenish.

Figure 2:
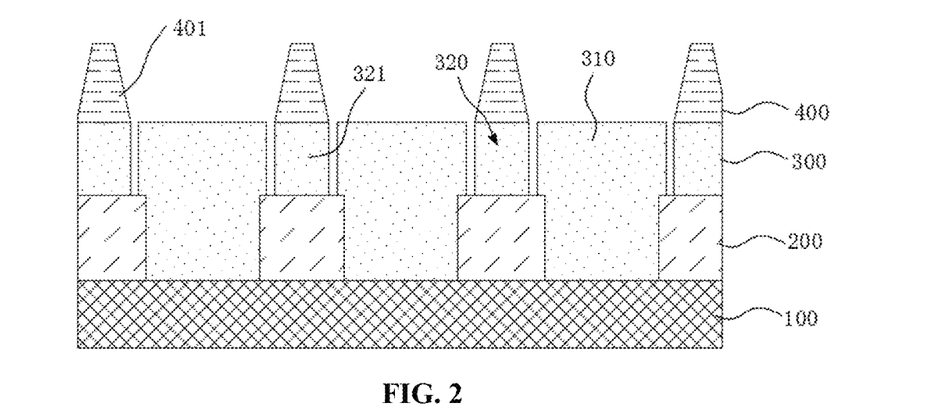
FIG. 2 is a schematic cross-sectional view of a structure of a color filter substrate of an embodiment of the present disclosure.
Figure 3:
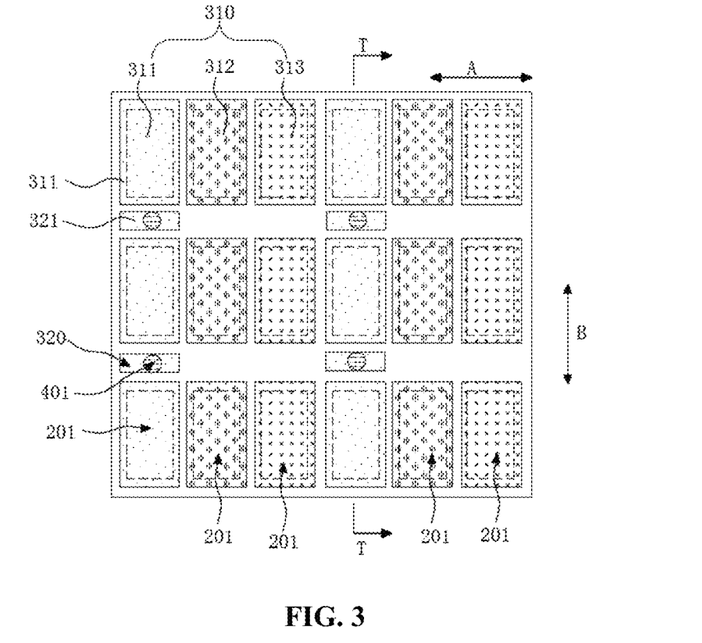
FIG. 3 is a schematic top view of a structure of a color filter substrate of an embodiment of the present disclosure.
Figure 4:
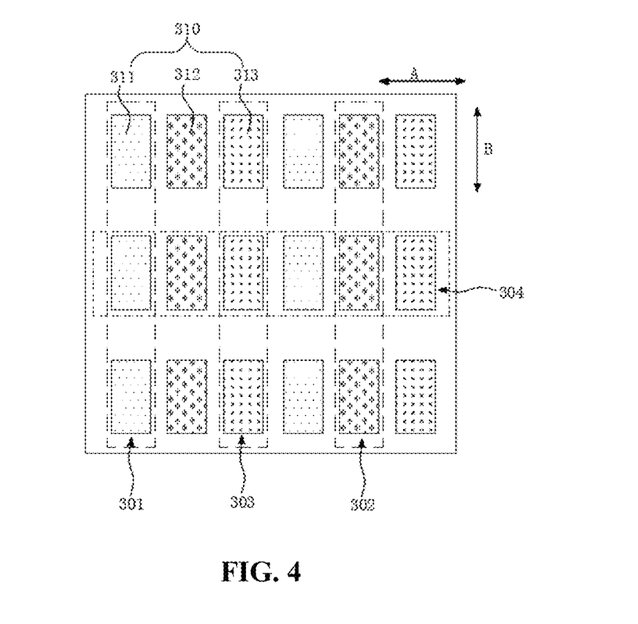
FIG. 4 is a schematic view of arrangement of color photoresist units of a color filter substrate of an embodiment of the present disclosure.

In order to solve this problem, the present disclosure provides a color filter substrate. FIG. 3 is a schematic top view of a structure of the color filter substrate, FIG. 2 is a schematic cross-sectional view of the color filter substrate along a line T-T, and FIG. 4 is a schematic view of arrangement of respective color photoresist units of the color filter substrate. As shown in FIGS. 2, 3 and 4, the color filter substrate includes a base substrate 100, a black matrix layer 200, and a color filter layer 300, wherein:

the color filter layer 300 is disposed on a side of the base substrate 100 and includes a plurality of color photoresist units 310 arranged in an array, the plurality of color photoresist units 310 being formed with a plurality of color photoresist rows 304, a plurality of first color photoresist columns 301, a plurality of second color photoresist columns 302 and a plurality of third color photoresist columns 303, wherein any one of the color photoresist rows 304 includes first color photoresist unit 311, second color photoresist units 312, and third color photoresist units 313 periodically arranged along a row direction A, any one of the first color photoresist columns 301 consists of a plurality of first color photoresist units 311, any one of the second color photoresist columns 302 consists of a plurality of second color photoresist units 312, and any one of the third color photoresist columns 303 consists of a plurality of third color photoresist units 313; and the color filter layer 300 further includes at least one filling part 320 located between the color photoresist rows 304 and having a thickness equal to that of at least one of the plurality of color photoresist units 310; and the black matrix layer 200 is disposed between the color filter layer 300 and the base substrate 100, and includes a plurality of light transmitting windows 201 (in FIG. 3, the light transmitting windows 201 are represented by dashed frames due to being blocked by the color filter layer); and respective light transmitting windows 201 are covered by respective color photoresist units 310 in a one-to-one correspondence.

In the color filter substrate provided by the present disclosure, respective color photoresist units 310 are arranged in an array, which can reduce overlapping area of the color photoresist units 310 and the black matrix layer 200 compared with the related art in which color photoresist strips are employed, thereby reducing a degree of transferring charges on the black matrix layer 200 to the color photoresist units 310. This can reduce or eliminate a potential difference between the color photoresist units 310 and pixel electrodes in a grayscale of 0 (L0) screen, thereby reducing or eliminating poor display of greening in the L0 screen. Not only that, the color filter layer 300 is also provided with the filling part 320, and a side of the filling part 320 far away from the base substrate 100 can be used to form a supporting pillar 401, so as to avoid a problem of manufacturing difficulty due to formation of the supporting pillar 401 on a surface of the black matrix layer 200 away from the base substrate 100. Since the thickness of the filling part 320 is the same as at least one of the plurality of color photoresist units 310, the liquid crystal cell of the display panel using the color filter substrate can have a cell thickness being more uniform.

Components of the array substrate provided by embodiments of the present disclosure will be explained in detail below with reference to the accompanying drawings.

The base substrate 100 may be a transparent base substrate 100 of an inorganic material, or may be a transparent base substrate 100 of an organic material. For example, in an embodiment of the present disclosure, the material of the base substrate 100 may be a glass material such as soda-lime glass, quartz glass, sapphire glass or the like. In another embodiment of the present disclosure, the material of the base substrate 100 may be polymethyl methacrylate (PMMA), polyvinyl alcohol (PVA) or the like, and the present disclosure does not make any special limitations on this.

The black matrix layer 200 is disposed on the side of the base substrate 100, and can be made of an opaque material. For example, in an embodiment of the present disclosure, the black matrix layer 200 may use a black photoresist material or a black resin material. The black matrix layer 200 includes the plurality of light transmitting windows 201, and light of the display panel exits through the light transmitting windows 201 to realize displaying a screen.

As shown in FIGS. 2 and 3, the color filter layer 300 is disposed on the side of the black matrix layer 200 away from the base substrate 100, and includes a plurality of color photoresist units 310. Respective color photoresist units 310 and respective light transmitting windows 201 are disposed in a one-to-one correspondence, and any one of the color photoresist units 310 covers corresponding one of the light transmitting windows 201.

In an embodiment of the present disclosure, in the liquid crystal display panel, gate wirings for driving the substrate in cooperation with the color filter substrate are located between the light transmitting windows 201. In particular, respective light transmitting window 201 forms a plurality of rows of light transmitting windows 201 linearly arranged along the row direction A, and an orthographic projection of the gate wirings on the black matrix layer 200 may be located between the rows of the light transmitting windows 201. As such, since respective color photoresist units 310, in particular, the third color photoresist units 313, no longer adopt arrangements of color photoresist strips, the overlapping area of the color photoresist unit 310 and the gate wirings is reduced, which can further reduce an ability of the color photoresist unit 310 to be charged caused by the gate wirings through coupling, and thus reduce power amount on the color photoresist units 310.

In the present disclosure, respective color photoresist units 310 and respective light transmitting windows 201 being disposed in a one-to-one correspondence means that each of the color photoresist units 310 corresponds to only one of the light transmitting windows 201 and each of the light transmitting windows 201 corresponds to only one of the color photoresist units 310. It can be understood that an orthographic projection of any one of the light transmitting window 201 on the base substrate 100 is located within an orthographic projection of corresponding one of the color photoresist units 310 on the base substrate 100.

In an embodiment of the present disclosure, the color photoresist units 310 may fill corresponding ones of the light transmitting windows 201 to realize complete coverage of the light transmitting windows 201.

In the color filter substrate of the present disclosure, as shown in FIG. 4, respective color photoresist units 310 may be disposed in a Real RGB arrangement. Exemplarily, the color photoresist units 310 arranged linearly along the same row direction A form a color photoresist row 304, and thus respective color photoresist units 310 of the color filter layer 300 may be formed with a plurality of color photoresist rows 304, and any one of the color photoresist rows 304 may include first color photoresist units 311, second color photoresist units 312, and third color photoresist units 313 arranged periodically. The color photoresist units 310 arranged linearly along the same column direction B form a color photoresist column, and thus respective color photoresist units 310 of the color filter layer 300 may be formed with a plurality of color photoresist columns. Among them, the color photoresist units 310 in any color photoresist column are color photoresist units 310 of a same color. Based on the difference of the color photoresist units 310 in the color photoresist rows, respective color photoresist units 310 of the color filter layer 300 are formed with a plurality of first color photoresist rows 301, a plurality of second color photoresist rows 302, and a plurality of third color photoresist rows 303, wherein any one of the first color photoresist columns 301 consists of a plurality of first color photoresist units 311, any one of the second color photoresist columns 302 consists of a plurality of second color photoresist units 312, and any one of third color photoresist columns 303 consists of a plurality of third color photoresist units 313.

Alternatively, the first color photoresist units 311 may be red color photoresist units, the second color photoresist units 312 may be blue color photoresist units, and the third color photoresist units 313 may be green color photoresist units. Alternatively, the red color photoresist units may have better physical and chemical stabilities than the green color photoresist units and the blue color photoresist units, and are less likely to fail or be damaged. Preferably, in an embodiment of the present disclosure, as shown in FIG. 3, the filling part 320 may include a first filling part 321, and the first filling part 321 uses the same material as the red color photoresist unit to improve physical and chemical stabilities of the color filter layer 300.

Alternatively, the red color photoresist units have a light transmittance lower than that of the green and blues color photoresist units. For example, the light transmittance of the red color photoresist units is generally about 20%, and the light transmittances of the green color photoresist unit and the blue color photoresist unit may be more than 60%.

The filling part 320 may be disposed on the surface of the black matrix layer 200 away from the base substrate 100. It can be understood that, referring to FIG. 3, an orthographic projection of the filling part 320 on the base substrate 100 is located within an orthographic projection of the black matrix layer 200 on the base substrate 100.

In the present disclosure, a thickness of the color photoresist unit 310 refers to a distance between a surface of the color photoresist unit 310 away from the base substrate 100 and the surface of the black matrix layer 200 away from the base substrate 100. In an embodiment of the present disclosure, when the color photoresist units 310 fill the light transmitting windows 201, a thickness of the color photoresist material of the color photoresist unit 310 at the light transmitting window 201 is a sum of the thickness of the color photoresist unit 310 and a depth of the light transmitting window 201.

Figure 5:
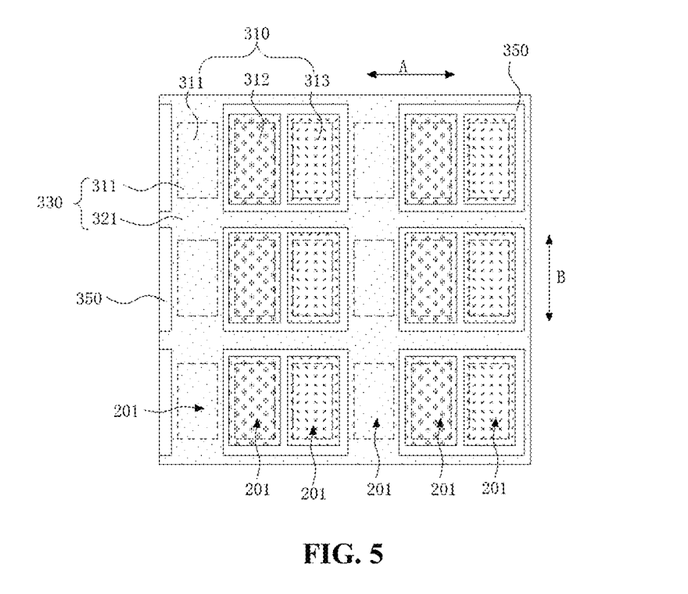
FIG. 5 is a schematic top view of a structure of a color filter substrate of an embodiment of the present disclosure.

In an embodiment of the present disclosure, in the color filter substrate provided by the present disclosure, as shown in FIG. 5, the filling part 320 may include a plurality of first filling parts 321, and respective first filling parts 321 may be connected to one another to form a whole, so as to improve a degree of filling gaps between respective color photoresist rows 304 by the first filling parts 321.

Alternatively, the first filling part 321 has the same material and thickness as the first color photoresist unit 311. As such, the first filling parts 321 and the first color photoresist units 311 may be prepared at the same time, which reduces manufacturing processes of the color filter substrate and reduces the number of required masks.

When the first color photoresist unit 311 has a light transmittance lower than that of the second color photoresist unit 312 and the third color photoresist unit 313, respective first filling parts 321 and respective first color photoresist units 311 can also be connected to one another. As such, coverage of the color filter layer 300 on the black matrix layer 200 can be further improved, which facilitates preparation of subsequent film layers such as a supporting pillar layer 400, and also helps to make cell thickness of the liquid crystal cells uniform. Since the light transmittance of the first color photoresist unit 311 is low, even if charges are transferred from the black matrix layer 200 to the first color photoresist units 311, which causes the liquid crystals to deflect and leak light in the L0 screen, the display panel will not exhibit an obvious light-emission phenomenon due to the leaked light having to pass through the first color photoresist units 311 of a relatively lower light transmittance. As such, it is possible to achieve a balance of reducing the light-emission of the display panel in the L0 screen and facilitating the preparation of the subsequent film layers, which not only reduces a degree of light-emission of the display panel in the L0 screen, but also avoids adverse effects of the improvement of the color filter layer 300 on the subsequent film layers.

Figure 6:
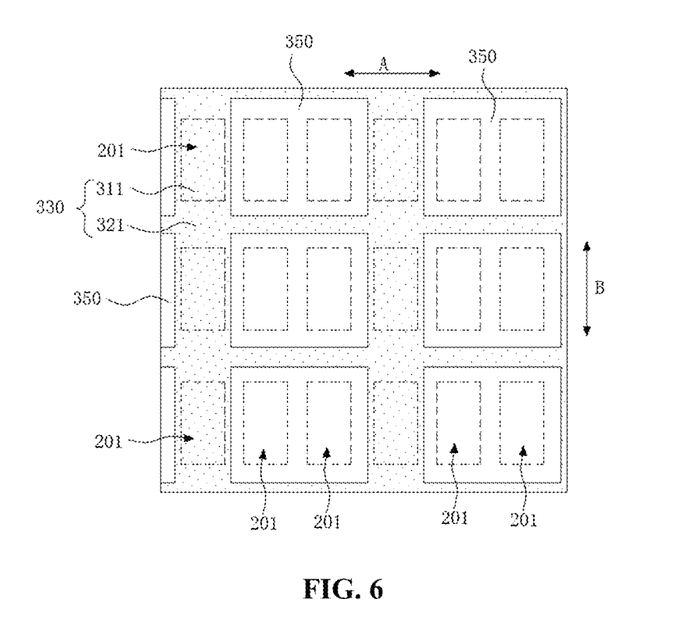
FIG. 6 is a schematic structure view of a first color photoresist pattern and a light transmitting window of an embodiment of the present disclosure.

Preferably, as shown in FIGS. 5 and 6, respective first filling parts 321 and respective first color photoresist units 311 are connected to each other to form first color photoresist patterns 330 including a plurality of exposure windows 350, any one of the exposure windows exposing two light transmitting windows 201 adjacently disposed. Light transmitting windows 201 exposed by one exposure window 350 are respectively covered by the second and third color photoresist units 312 and 313. In other words, only one second color photoresist unit 312 and one third color photoresist unit 313 are provided in one exposure window 350. Preferably, second and third color photoresist units 312 and 313 in one exposure window 350 are adjacently arranged along the row direction A. As such, the first color photoresist patterns 330 can be easily prepared, so that the first color photoresist patterns 330 can be avoided from being disposed in gaps between two different colors of sub-pixels adjacently arranged, thereby avoiding partially overlapping of the first color photoresist patterns 330 with the second color photoresist units 312 or the third color photoresist units 313 due to alignment error, which can make the thickness of the liquid crystal cell of the display panel to be uniform.

Alternatively, the exposure window 350 may be a rectangular window, that is, an orthographic projection of the exposure window 350 on the base substrate 100 is a rectangle. As such, the first color photoresist patterns 330 can be easily prepared.

For example, the first color photoresist units 311 are red color photoresist units, that is, the first color photoresist patterns 330 are made of a red color photoresist material, any one of the exposure windows 350 exposes two light transmitting windows 201 adjacently arranged along the row direction A, and two light transmitting windows 201 exposed by a same exposure window 350 are respectively covered by green and blue color photoresist units. As such, in the color filter substrate provided by the present disclosure, each of the green and blue color photoresist units is designed in an island shape, and the first color photoresist pattern 330 formed by the red color photoresist unit and the first filling part 321 appears in a grid shape constituted by a red photoresist material.

Figure 7:
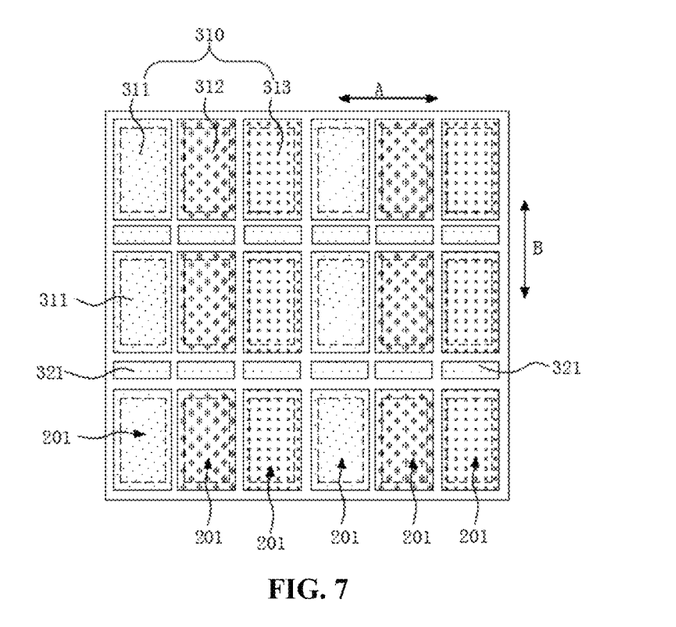
FIG. 7 is a schematic top view of a structure of a color filter substrate of an embodiment of the present disclosure.
Figure 8:
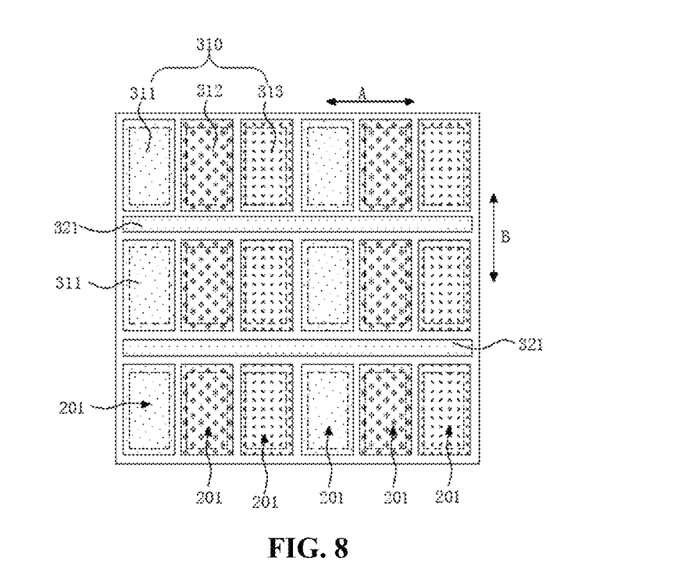
FIG. 8 is a schematic top view of a structure of a color filter substrate of an embodiment of the present disclosure.

In another embodiment of the present disclosure, as shown in FIG. 7, the first filling parts 321 are provided along the row direction A, each of which is disposed between two adjacent color photoresist units 310. In other words, one first filling part 321 is provided between two adjacent first color photoresist units 311 of any one of the first color photoresist columns 301, one first filling part 321 is provided between two adjacent second color photoresist units 312 of any one of the second color photoresist columns 302, and one first filling part 321 is provided between two adjacent third color photoresist units 311 of any one of the third color photoresist columns 301. As such, the first filling parts 321 can have increased coverage area, which can easily make the thickness of the liquid crystal cell of the display panel to be uniform. Preferably, the first filling part 321 has the same material and thickness as the first color photoresist unit 311, so that the first filling part 321 and the first color photoresist unit 311 are prepared in the same process. Further, as shown in FIG. 8, respective first filling parts 321 disposed along the same row direction A may be connected to one another to form a strip shape, so as to further increase the coverage area of the first filling part 321 and further uniform the thickness of the liquid crystal cell of the display panel.

Figure 9:
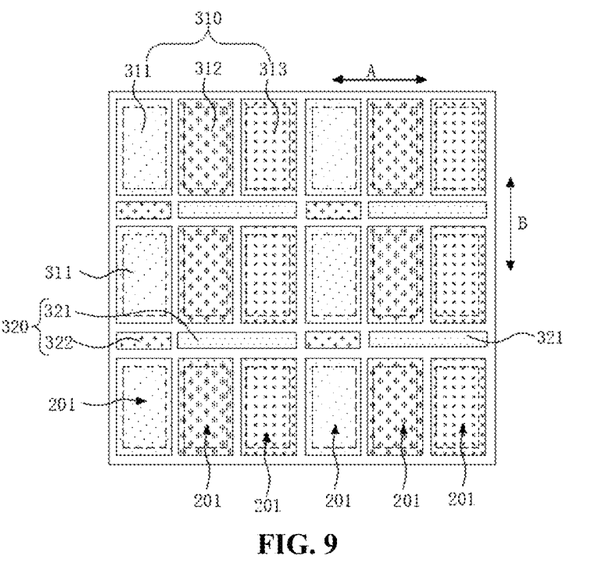
FIG. 9 is a schematic top view of a structure of a color filter substrate of an embodiment of the present disclosure.

In another embodiment of the present disclosure, as shown in FIG. 9, the filling part 320 includes a first filling part 321 and a second filling part 322, wherein the first filling part 321 has a same material and thickness as the first color photoresist unit 311, and the second filling part 322 has a same as the material and thickness of the second color photoresist unit 312. In the color filter substrate, the first filling parts 321 and the first color photoresist units 311 may be formed through the same process, and the second filling parts 322 and the second color photoresist units 312 may be formed through the same process, thereby simplifying the preparation of the color filter substrate, and avoiding using of additional processes to fill gaps between the color photoresist units 310 to provide support for the supporting pillars 401.

Preferably, as shown in FIG. 9, in the same first color photoresist column 301, one second filling part 322 is provided between two adjacent first color photoresist units 311; in the same second color photoresist column 302, one first filling part 321 is provided between two adjacent second color photoresist units 312; and in the same third color photoresist column 303a, one first filling part 321 is provided between two adjacent third color photoresist units 313. As such, a possibility of connection between the color photoresist units 310 and the filling part 320 (the first and second filling parts 321 and 322) can be reduced, which helps to reduce transferring of charges from the filling part 320 (the first and second filling parts 321 and 322) to the color photoresist unit 310 and helps to reduce accumulation of charges on the color photoresist unit 310.

Figure 10:
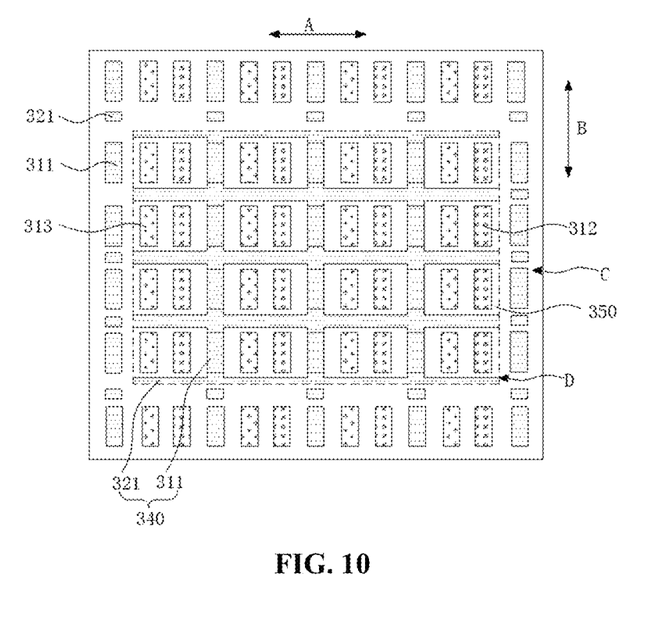
FIG. 10 is a schematic top view of a structure of a color filter substrate of an embodiment of the present disclosure.

In an embodiment of the present disclosure, as shown in FIG. 10, the color filter substrate includes an edge area C and a central area D (which is the area within the dotted line in FIG. 10) surrounded by the edge area, and in the edge area C, any one of the filling parts 320 is not connected with any one of the color photoresist units 310. As such, charges on the filling part 320 can be prevented from being transferred to the color photoresist unit 310 in the edge area C, thereby suppressing color shift of the display panel at edge positions.

In the embodiment of the present disclosure, the edge area C is in a closed ring shape, and may include one or more color photoresist rows on the outermost side of the color filter layer 300 and one or more color photoresist rows on the outermost side. In the edge area C, a filling part 320 located between the color photoresist rows may be included. The central area D is surrounded by the edge area C, such that none of the color photoresist units 310 in the central area D is located in the outermost color photoresist row or column.

Alternatively, the first color photoresist unit 311 has a lower transmittance than the second color photoresist unit 312 and the third color photoresist unit 313, and respective first filling parts 321 and respective first color photoresist units 311 are connected to each other to form a second color photoresist in the central area D. In the edge area C, the first color photoresist units 311 and the first filling parts 321 are not connected to each other, which can prevent charges on the first filling parts 321 from being transferred to the first color photoresist units 311, and reduce color shift of the display panel at edges. In the central area D, respective first filling parts 321 and respective first color photoresist units 311 are connected to each other to form a second color photoresist pattern 340, which can reduce a complexity degree of a mask for preparing the first color photoresist units 311 and the first filling parts 321, and reduce cost for preparing the color filter substrate.

An overlapping size of each color photoresist unit 310 and the black matrix layer 200 can be selected and determined according to factors such as process accuracy. Within the range allowed by the process, the overlapping size of each color photoresist unit 310 and the black matrix layer 200 can be as small as possible, so as to reduce an amount of charges on the black matrix layer 200 being transferred to the color photoresist units 310, thereby avoiding an electromotive force from being generated between the color photoresist units 310 and the pixel electrode in the L0 screen, or reducing the electromotive force between the color photoresist units 310 and the pixel electrode in the L0 screen.

In an embodiment of the present disclosure, a minimum distance between edges of the orthographic projection of each color photoresist unit 310 on the base substrate 100 and edges of the orthographic projection of the corresponding light transmitting window 201 on the base substrate 100 is 0-14 micrometers ($\mu m$). Preferably, the minimum distance between the edges of the orthographic projection of each color photoresist unit 310 on the base substrate 100 and the edges of the orthographic projection of the corresponding light transmitting window 201 on the base substrate 100 is 5.5-8.5 $\mu m$, and for example, it may be 7 $\mu m$.

Alternatively, when designing the layout of the color filter substrate, the minimum distance between the edges of the orthographic projection of each color photoresist unit 310 on the base substrate 100 and the edges of the orthographic projection of the corresponding light transmitting window 201 on the base substrate 100 is 7 $\mu m$.

A gap between the color photoresist units 310 can be set according to requirements such as a resolution, process accuracy, etc. of the display panel. Generally, the higher the resolution of the display panel, the alignment accuracy, etc., the gap between the color photoresist units 310 may be smaller.

In an embodiment of the present disclosure, a distance between two adjacent color photoresist units 310 may be 0-24.5 $\mu m$, preferably, the distance between two adjacent color photoresist units 310 may be 3.5-17.5 $\mu m$, and in particular, the distance between two adjacent color photoresist units 310 may be 9-12 $\mu m$. For example, the distance between two adjacent color photoresist units 310 may be 10.5 $\mu m$. Alternatively, when designing the layout of the color filter substrate, the distance between two adjacent color photoresist units 310 may be 10.5 $\mu m$.

In an embodiment of the present disclosure, a distance between the second color photoresist unit 312 or the third color photoresist unit 313 and the filling part 320 may be 0-24.5 $\mu m$. Preferably, the distance between the second color photoresist unit 312 or the third color photoresist unit 313 and the filling part 320 may be 3.5-17.5 $\mu m$, and in particular, the distance between the second color photoresist unit 312 or the third color photoresist unit 313 and the filling part 320 may be 9-12 $\mu m$. For example, the distance between the second color photoresist unit 312 or the third color photoresist unit 313 and the filling part 320 may be 10.5 $\mu m$. Alternatively, when designing the layout of the color filter substrate, the distance between the second color photoresist unit 312 or the third color photoresist unit 313 and the filling part 320 may be 10.5 $\mu m$.

As shown in FIG. 2, the color filter substrate provided by the present disclosure may further include a supporting pillar layer 400, and the supporting pillar layer 400 is provided on the side of the color filter layer 300 away from the base substrate 100; and the supporting pillar layer 400 includes a plurality of supporting pillars 401, and any one of the supporting pillars 401 is provided on the side of the filling part 320 away from the base substrate 100.

Preferably, an orthographic projection of the supporting pillar 401 on the base substrate 100 is located in the orthographic projection of the filling part 320 on the base substrate 100.

Embodiments of the present disclosure also provide a display panel including any kind of the color filter substrates described in the above embodiments, and an array substrate disposed opposite to the color filter substrate. The display panel may be a splicing display screen, a screen of a mobile phone, or other types of display panels. Since the display panel has any one of the color filter substrates described in the above embodiments, it has the same beneficial effects, which will not be repeated in this disclosure.

It should be understood that the present disclosure does not limit its application to the detailed structure and arrangement of components proposed in this specification. The present disclosure can have other embodiments, and can be implemented and executed in various ways. The aforementioned deformations and modifications fall within the scope of the present disclosure. It should be understood that the present disclosure disclosed and defined in this specification extends to all alternative combinations of two or more individual features mentioned or obvious in the text and/or drawings. All these different combinations constitute multiple alternative aspects of the present disclosure. The embodiments of the present specification illustrate the best way known for implementing the present disclosure, and will enable those skilled in the art to utilize the present disclosure.

What is claimed is:

1. A color filter substrate, comprising:
   a base substrate;
   a color filter layer, disposed on a side of the base substrate and comprising a plurality of color photoresist units arranged in an array, the plurality of color photoresist units being formed with a plurality of color photoresist rows, a plurality of first color photoresist columns, a plurality of second color photoresist columns and a plurality of third color photoresist columns, wherein any one of the color photoresist rows comprises a first color photoresist unit, a second color photoresist unit, and a third color photoresist unit in periodic arrangement, any one of the first color photoresist columns comprises a plurality of first color photoresist units, any one of the second color photoresist columns comprises a plurality of second color photoresist units, and any one of the third color photoresist columns comprises a plurality of third color photoresist units, and wherein the color filter layer further comprises at least one filling part located between the color photoresist rows; and
   a black matrix layer, disposed between the color filter layer and the base substrate, and comprising a plurality of light transmitting windows covered by respective color photoresist units in a one-to-one correspondence, wherein
   the at least one filling part comprises a first filling part located between two adjacent second color photoresist units within a same one of the second color photoresist columns and a second filling part located between two adjacent first color photoresist units within a same one of the first color photoresist columns, the first filling part has a different material from the second color photoresist unit, the second filling part has a different material from the first color photoresist unit,
   the first filling part is contiguously disposed between the two adjacent second color photoresist units within the same one of the second color photoresist columns and between two adjacent third color photoresist units within a same one of the third color photoresist columns, and is not contiguously disposed between the two adjacent first color photoresist units within the same one of the first color photoresist columns, and
   the first filling part has a same material as the first color photoresist units, and the second filling part has a same material as the second color photoresist units.

2. The color filter substrate according to claim 1, wherein the first color photoresist unit is red color photoresist unit, one of the second color photoresist unit and the third color photoresist unit is blue color photoresist unit, and another one of the second color photoresist unit and the third color photoresist units is green color photoresist unit.

3. The color filter substrate according to claim 1, wherein, one row-wise side of the first filling part is aligned with a side of the second color photoresist unit, and another row-wise side of the first filling part is aligned with a side of the third color photoresist unit.

4. The color filter substrate according to claim 1, wherein, one row-wise side of the second filling part is aligned with a side of the first color photoresist unit, and another row-wise side of the second filling part is aligned with another side of the first color photoresist unit.

5. The color filter substrate according to claim 1, wherein a gap is provided between the first filling part and the second filling part in an extending direction of the color photoresist row.

6. The color filter substrate according to claim 1, wherein, along an extending direction of one of the second color photoresist columns, a distance between one side of the second color photoresist unit and a closest side of a corresponding light transmitting window, is smaller than a distance between the side of the second color photoresist unit and a closest side of the first filling part.

7. The color filter substrate according to claim 1[[26]], wherein the first filling part has a same thickness as the first color photoresist units, and the second filling part has a same thickness as the second color photoresist units.

8. The color filter substrate according to claim 1, wherein the color filter substrate comprises a display area, and the first filling parts are provided at both sides of one of the second color photoresist units located at a column-wise edge of the display area.

9. The color filter substrate according to claim 1, wherein the color filter substrate comprises a display area, and the first filling parts are provided at both sides of the second color photoresist units located at each of both column-wise edges of the display area.

10. The color filter substrate according to claim 1, further comprising a supporting pillar, disposed on a side of the filling part away from the base substrate, an orthographic projection of the supporting pillar on the base substrate is located at center of a gap between orthographic projections of the two adjacent color photoresist units on the base substrate along an extending direction of the color photoresist column.

11. The color filter substrate according to claim 10, wherein the orthographic projection of the supporting pillar on the base substrate is located within an orthographic projection of the second filling part on the base substrate.

12. The color filter substrate according to claim 10, wherein the orthographic projection of the supporting pillar on the base substrate is located within an orthographic projection of the first filling part on the base substrate.

13. The color filter substrate according to claim 1, further comprising a supporting pillar, disposed on a side of the filling part away from the base substrate, an orthographic projection of the supporting pillar on the base substrate is located at center of a gap between orthographic projections of the two adjacent first color photoresist units on the base substrate along an extending direction of the first color photoresist column.

14. The color filter substrate according to claim 1, along an extending direction of the second color photoresist column, a distance between one side of the first filling part and a closet second color photoresist unit, is equal to a distance between another side of the first filling part and a closet second color photoresist unit.

15. The color filter substrate according to claim 1, along an extending direction of the first color photoresist column, a distance between one side of the second filling part and a closet first color photoresist unit, is equal to a distance between another side of the second filling part and a closet first color photoresist unit.

16. The color filter substrate according to claim 1, wherein the first color photoresist units are red color photoresist units, the second color photoresist units are blue color photoresist units, and the third color photoresist units are green color photoresist units.

17. The color filter substrate according to claim 1, wherein the color filter substrate comprises an edge area and a central area surrounded by the edge area, the plurality of color photoresist units comprises a plurality of central-area color photoresist units and a plurality of edge-area color photoresist units located around the plurality of central-area color photoresist units;
- the at least one filling part comprises a plurality of central-area filling parts located between adjacent rows of the plurality of central-area color photoresist units, and a plurality of edge-area filling parts located between adjacent rows of the plurality of edge-area color photoresist units;
- the edge area is provided with the plurality of edge-area color photoresist units and the plurality of edge-area filling parts, any one of the edge-area filling parts is not connected with any one of the edge-area color photoresist units; and
- the central area is provided with the plurality of central-area color photoresist units and the plurality of central-area filling parts, at least one of the central-area filling parts is directly connected with at least one of the central-area color photoresist units.

18. A display panel, comprising a color filter substrate and an array substrate disposed opposite to the color filter substrate,
wherein the color filter substrate comprises:
a base substrate;
a color filter layer, disposed on a side of the base substrate and comprising a plurality of color photoresist units arranged in an array, the plurality of color photoresist units being formed with a plurality of color photoresist rows, a plurality of first color photoresist columns, a plurality of second color photoresist columns and a plurality of third color photoresist columns, wherein any one of the color photoresist rows comprises a first color photoresist unit, a second color photoresist unit, and a third color photoresist unit in periodic arrangement, any one of the first color photoresist columns comprises a plurality of first color photoresist units, any one of the second color photoresist columns comprises a plurality of second color photoresist units, and any one of the third color photoresist columns comprises a plurality of third color photoresist units, and wherein the color filter layer further comprises at least one filling part located between the color photoresist rows; and
a black matrix layer, disposed between the color filter layer and the base substrate, and comprising a plurality of light transmitting windows covered by respective color photoresist units in a one-to-one correspondence,
wherein
the at least one filling part comprises a first filling part located between two adjacent second color photoresist units within a same one of the second color photoresist columns and a second filling part located between two adjacent first color photoresist units within a same one of the first color photoresist columns, the first filling part has a different material from the second color photoresist unit, the second filling part has a different material from the first color photoresist unit,
the first filling part is contiguously disposed between the two adjacent second color photoresist units within the same one of the second color photoresist columns and between two adjacent third color photoresist units within a same one of the third color photoresist columns, and is not contiguously disposed between the two adjacent first color photoresist units within the same one of the first color photoresist columns, and
the first filling part has a same material as the first color photoresist units, and the second filling part has a same material as the second color photoresist units.

* * * * *